Fig. 1A

INVENTOR.
Thomas A. Insolio
BY
Webb, Mackey & Burden
HIS ATTORNEYS

T. A. INSOLIO 3,174,613

TRANSFER CONVEYOR

Filed Feb. 25, 1963

INVENTOR.
Thomas A. Insolio
BY
Webb, Mackey + Burden
HIS ATTORNEYS

INVENTOR.
Thomas A. Insolio
BY
Webb, Mackey & Burden
HIS ATTORNEYS

March 23, 1965   T. A. INSOLIO   3,174,613
TRANSFER CONVEYOR
Filed Feb. 25, 1963   9 Sheets-Sheet 5

INVENTOR.
Thomas A. Insolio
BY
Webb, Mackey + Burden
HIS ATTORNEYS

Fig. 7

INVENTOR.
Thomas A. Insolio
BY
Webb, Mackey & Burden
HIS ATTORNEYS

INVENTOR.
Thomas A. Insolio
BY
Webb, Mackey & Burden
HIS ATTORNEYS

March 23, 1965     T. A. INSOLIO     3,174,613
TRANSFER CONVEYOR

Filed Feb. 25, 1963     9 Sheets-Sheet 9

INVENTOR.
Thomas A. Insolio
BY
Webb, Mackey + Burden
HIS ATTORNEYS

United States Patent Office 3,174,613
Patented Mar. 23, 1965

3,174,613
TRANSFER CONVEYOR
Thomas A. Insolio, Jeannette, Pa., assignor to American-Saint Gobain Corporation, Kingsport, Tenn., a corporation of Delaware
Filed Feb. 25, 1963, Ser. No. 260,371
17 Claims. (Cl. 198—31)

This invention relates to a transfer conveyor and more particularly to a transfer conveyor arranged to transfer sheet material from a longitudinal primary conveyor to a laterally offset secondary conveyor.

In the sizing and inspection of glass sheets, it is often necessary to transfer the sheets from a main or primary conveyor to other secondary conveyors which generally extend laterally therefrom. The transferring of the selected sheets from the primary conveyor to the various secondary conveyors is required to provide additional cutting and processing conveyor lines which extend laterally from the primary processing conveyor. For example, in the cutting and handling of sheets of glass, conventional cutting machines are arranged to size and cut sheets of glass by making longitudinal scores in the large glass sheet and breaking the sheet along the scores. This sizing of the large sheets of glass results in elongated rectangular pieces. For certain uses it is desirable to cut these elongated rectangular pieces into other sizes such as substantially square pieces of glass or elongated rectangular pieces having different dimensions. Since the conventional cutting machines are arranged to make a longitudinal cut in the glass sheet, it is necessary to rotate the elongated rectangular sheet of glass 90° before it is introduced into the second cutting machine for the final sizing operation. Also, in the processing of sheets of glass it is often, because of various customer requirements, necessary to prepare sheets of different longitudinal and lateral dimensions. To adjust the individual cutting machines for these changes in sizes is time-consuming and reduces the productivity of the glass sheet processing. With a plurality of cutting machines positioned laterally of the main conveyor, preselected quantities of glass sheets can be directed to the various laterally spaced cutting machines to provide the desired quantity of particularly sized glass sheets.

Where glass sheets are scored transversally as described in my co-pending patent application "Method and Apparatus for Cutting, Transporting and Distributing Glass Sheets," Serial No. 235,932, filed November 7, 1962, it is desirable to transfer transversally cut and broken strips to a secondary conveyor so that the long dimension of the strips are positioned parallel to the secondary conveyor for further transverse scoring and breaking.

One of the basic problems in transferring glass sheets from a main longitudinal conveyor to a lateral conveyor is the speed at which the transfer can be made. It has been determined that the manual pickoff method wherein an operator manually lifts the glass sheet from the longitudinal main conveyor and positions it on an adjacent lateral conveyor is limited to a maximum main conveyor speed of about 65 feet per minute for sheets of reasonable weight and size. The pick-off speed is even less for larger and for heavier sheets. This limits the rate at which the glass sheets can be efficiently transferred from the primary conveyor to laterally offset secondary conveyors. There is also a need for a transfer conveyor that will automatically remove any sheet of glass from a series of sheets of glass moving on a main conveyor without interrupting or interfering with the speed or movement of the other sheets.

With my improved transfer conveyor it is now possible to remove a preselected sheet of glass from a series of sheets moving on a primary conveyor to a secondary conveyor extending laterally therefrom without interrupting the speed of movement of the other sheets. Also, there is no need to change elevations nor are any of the conveyed strips of glass picked up manually or otherwise lifted from the conveyors in order to effect a transfer. My transfer conveyor includes a means for detecting coded or instructed sheets or strips of glass and transferring them to any of a number of preselected lateral secondary conveyors for differing or similar processing through a plurality of sensors or detectors which detect the sheet which is to be transferred, and to effect its transfer automatically without reducing the speed of the primary conveyor or adversely affecting its flow.

The transfer conveyor of my invention forms a segment of the primary conveyor line and a segment of the secondary conveyor line and consists of swivel wheels which are all driven at predetermined speeds. The swivel wheels associated with the primary conveyor are, under normal conditions, aligned with the direction of travel of the primary conveyor and are driven at a speed equal to the speed of the remainder of the primary conveyor. In this manner glass sheets which are not selected to be transferred continue in an uninterrupted fashion at the same speed past the lateral conveyor. There are a plurality of detectors employed to detect the presence of a sheet of glass. When the trailing edge of the preselected sheet passes over a first detector, the swivel wheels in all of the rows beneath the sheet turn from the aligned direction of the primary conveyor to an angle of 45° toward the transfer conveyor. In this manner the selected sheet begins to move at an angle of 45° to the path of the main conveyor. The speed of the swivel wheels is simultaneously increased so that the speed component of the preselected sheet in the direction of travel of the primary conveyor remains substantially the same. As the sheet progresses, succeeding transverse rows of swivel wheels actuated by detectors also pivot 45° to thereby transfer the sheet from the main primary conveyor to the transfer conveyor. As soon as the trailing edge of the preselected sheet passes the first transverse row of swivel wheels, the wheels are again returned to their aligned position with the primary conveyor and the speed of the swivel wheels is reduced to the base speed of the primary conveyor. The swivel wheels of a portion of the transfer conveyor associated with the lateral secondary conveyor are normally positioned at a 45° angle to receive the sheet as it is transferred from the primary conveyor. After the sheet has progressed a predetermined distance on this portion of the transfer conveyor, the sheet actuates an edge detector and pivots the swivel wheels associated with the secondary conveyor to direct the sheet toward the secondary conveyor at its conveyor speed.

The size of the transverse section of the transfer conveyor is such that the selected sheet is clear of the primary conveyor or main conveyor when the controls of the secondary conveyor take over.

With my improved transfer conveyor it is now possible to select either succeeding sheets of glass or sheets at random from the primary conveyor and transfer the selected sheets to any one of a number of laterally extending secondary conveyors without manually handling the glass sheets.

The method and apparatus which comprise this invention accomplish the foregoing and other functions in a novel way as will now be explained. Further features, objects and advantages will either be specifically pointed out or become apparent when, for a better understanding of the invention, reference is made to the following written description, taken in conjunction with the accompanying drawings which form a part hereof, and in which drawings:

FIGURE 1 (composed of FIGURES 1A and 1B) is a general semi-schematic plan view of the apparatus of the present invention, illustrating a primary conveyor and three lateral secondary conveyors;

Figure 1A:
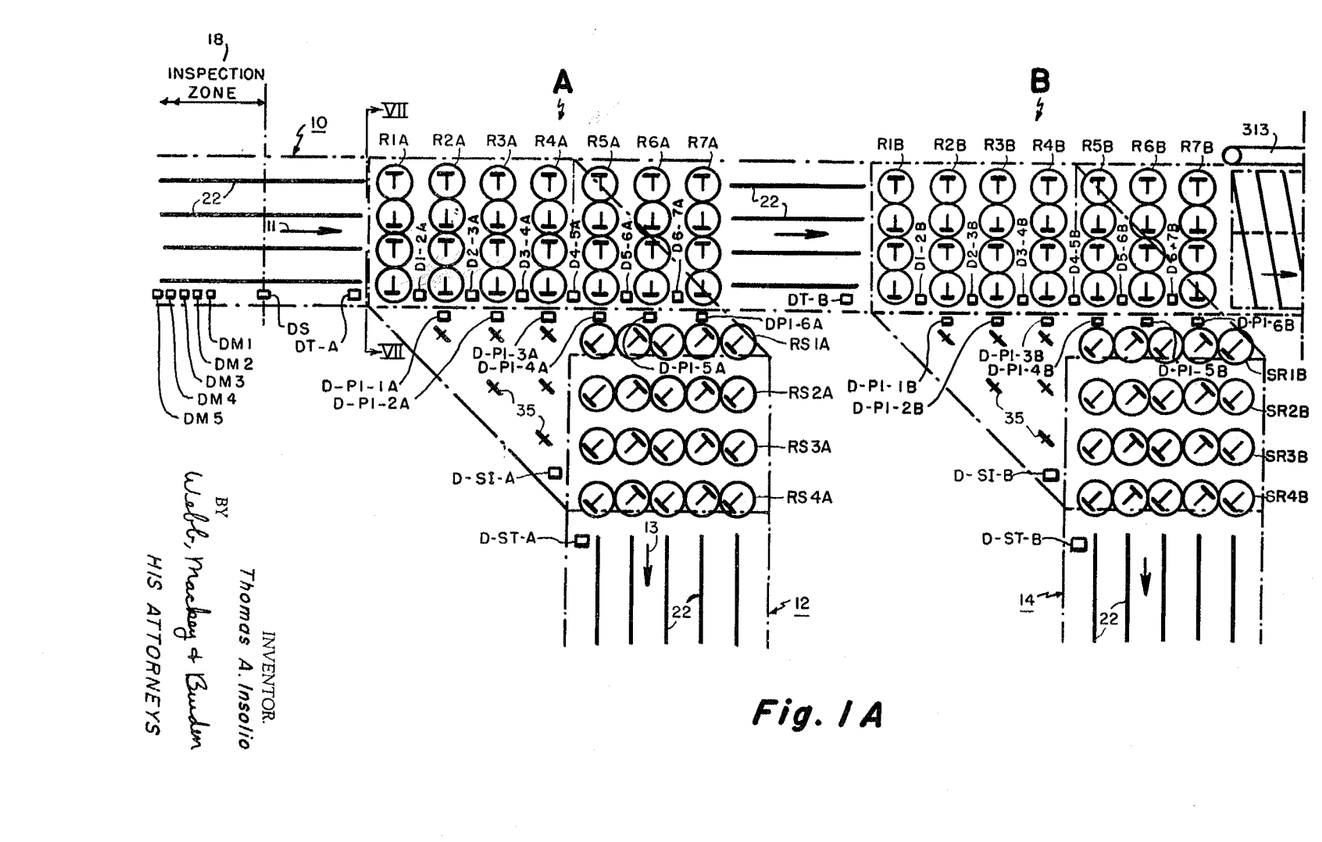
Figure 1B:
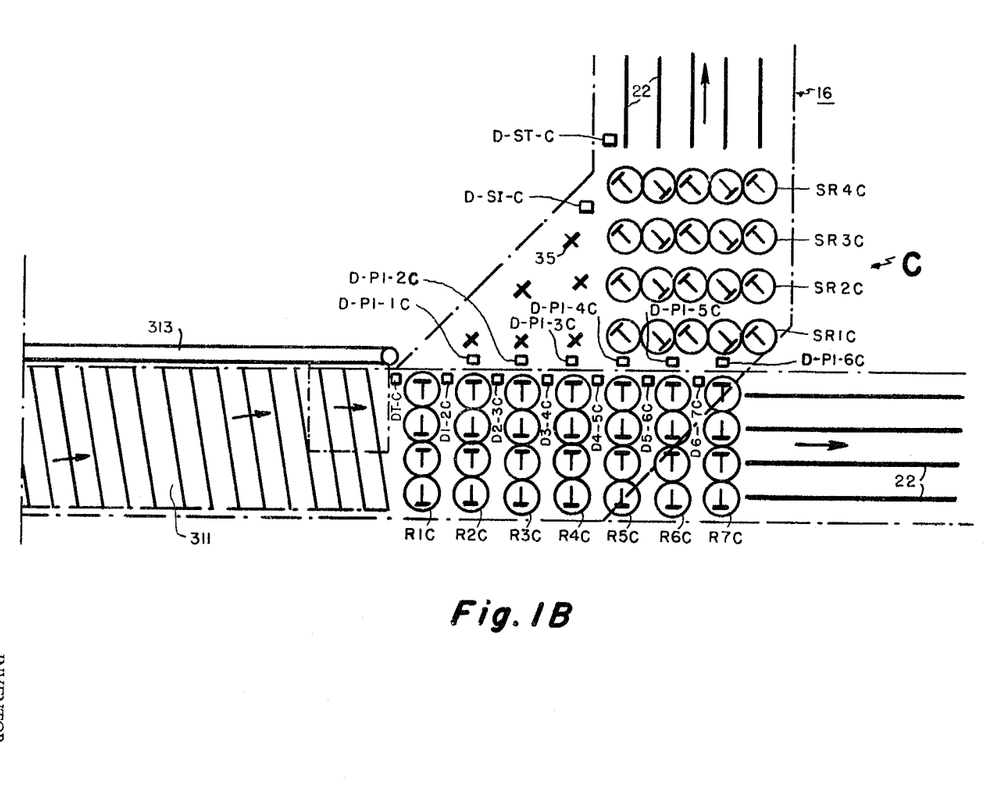

Referring to FIGURE 1, there is illustrated a primary conveyor 10 and three secondary conveyors 12, 14 and 16 extending laterally therefrom. Interposed between the primary conveyor 10 and the lateral secondary conveyors 12, 14 and 16 there are the transfer apparatus A, B and C, respectively, which effect transfer of the preselected sheets which are coded in the inspection zone 18, wherein the secondary conveyors 12, 14 and 16 for the individual sheet of glass are selected. The transfer apparatus A, B and C are substantially identical to one another and possess substantially identical parts, and consequently a detailed description of one will serve as a detailed description for all three.

It may be observed that the secondary conveyor 16 proceeds laterally in an opposite direction to the secondary conveyors 12 and 14. However, such deviation is of little significance in the apparatus and systems of the present invention since the modifications necessary to effect a transfer in one direction from the primary conveyor 10 are obvious from the detailed description of a means of transferring a sheet to a secondary conveyor in the opposite direction.

FIGURES 2 through 6 show a preselected sheet 20 being transferred from the primary conveyor 10 to the secondary conveyor 12 through the apparatus A. Both the primary and secondary conveyors 10 and 12 are belt type conveyors and include a plurality of endless belts 22 positioned around rollers 24 which are supported on a common shaft 26. The exact construction of the primary and secondary conveyors is conventional and optional and will not be described in detail in this specification. The sheets of glass are arranged to be positioned when the top faces of the parallel belts 22 are propelled in the direction indicated by the arrows.

In FIGURES 2 through 6, a glass sheet 20 is shown being conveyed along the primary conveyor 10 and is subsequently transferred to secondary conveyor 12 from between the sheets 28 and 30 which precede and follow the preselected sheet.

The apparatus A is shown to be composed of a series of seven rows of swivel wheels, the rows being identified as row R1A through row R7A, respectively. These rows of swivel wheels are positioned between conveyor units 32 and 34 of the primary conveyor. Four additional rows of swivel wheels identified as RS1A through RS4A are shown to lead laterally from the primary conveyor to secondary conveyor 12. In the angle formed between the rows R1A through R7A and RS1A through RS4A, there are six additional swivel wheels 35 which are positioned to rotate in a direction of 45° from the direction of both the primary and secondary conveyors.

Figure 2:
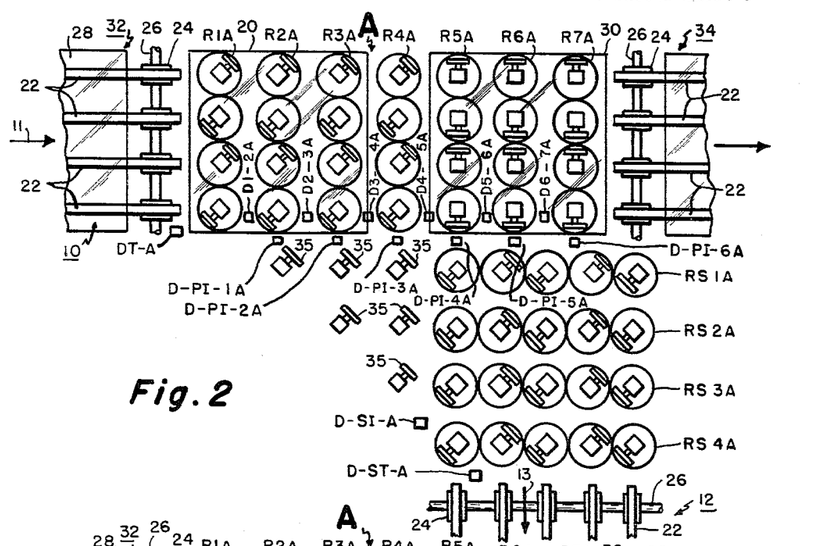
FIGURES 2, 3, 4, 5 and 6 are top plan semi-schematic views of a portion of the primary conveyor and one of the lateral secondary conveyors of the apparatus of FIGURE 1, illustrating a sheet of glass being transferred from the primary conveyor to the secondary conveyor extending laterally therefrom.

It may be observed that the swivel wheels of rows R1A through R7A as shown by FIGURE 1 are all aligned in a direction common to the belts 22 of the primary conveyor so that if this is regarded as their normal position, they are aligned in the direction of the primary conveyor and disposed to propel the sheet in the direction of the primary conveyor. FIGURE 2 shows the wheels of the rows RS1A, RS2A, RS3A and RS4A to be aligned in a 45° angle from the primary conveyor. The swivel wheels of rows R1A through R7A and RS1A through RS4A are disposed to rotate through a 45° angle in a manner that will hereafter be described. In FIGURE 2 the glass sheet 20 is shown to have progressed along the primary conveyor 10 and onto the apparatus A to a point where it has covered rows R1A, R2A and R3A. For purposes of the present description, we may assume that sheet 20 has been coded and designated in a manner to be transferred to the secondary conveyor 12, and, consequently, all the swivel wheels of rows R1A, R2A and R3A have simultaneously pivoted so that they now are at a 45° angle to the normal direction of travel of the primary conveyor 10. It may be seen in FIGURE 3 that the sheet 20 responds to the rotation of the swivel wheels R1A, R2A and R3A to travel at a 45° angle from the primary conveyor 10 towards the secondary conveyor 12 although it has not rotated in any manner so that its leading edge continues to be its leading edge insofar as the primary conveyor is concerned. It will also be observed that the spacing between sheet 20 and sheet 28 and also the spacing between sheet 20 and sheet 30 has remained constant. This is only possible because the swivel wheels of rows R1A, R2A and R3A (also R4A) are rotating faster than the normal speed of the primary conveyor 10 so that the sheet 20 is moving in a direction parallel to the direction of the primary conveyor 10 (arrow 11) at the same speed as sheets 28 and 30, while simultaneously moving laterally at a 45° angle from the primary conveyor. It may also be observed that row R1A in FIGURE 3 has once again rotated 45° so that its swivel wheels are now aligned with the primary conveyor 10, while row RS5A has rotated 45° so that any of the wheels of row RS5A that are contacted by the sheet 20 will also propel the sheet 20 laterally in the direction of the secondary conveyor as well as in the direction of arrow 11. The speed of the wheels of row R1A is reduced to normal when they are realigned with the primary conveyor. The speed of the wheels of row RS5A increased when they turned 45°.

Figure 3:
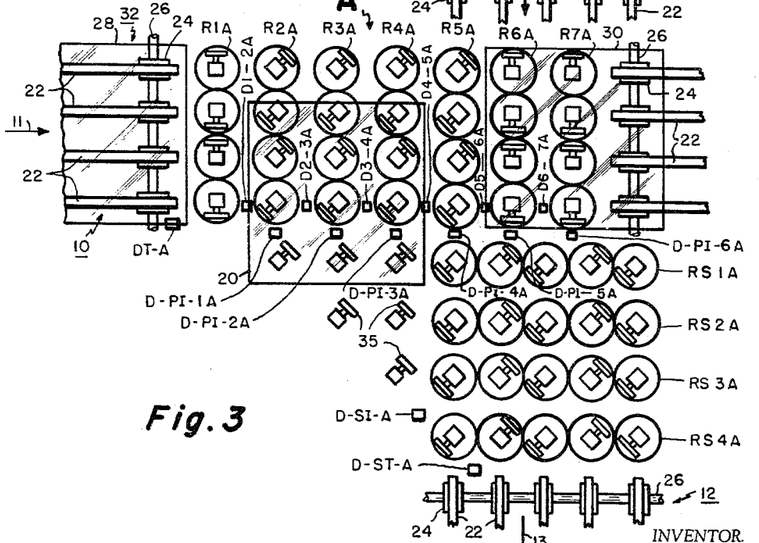
Figure 4:
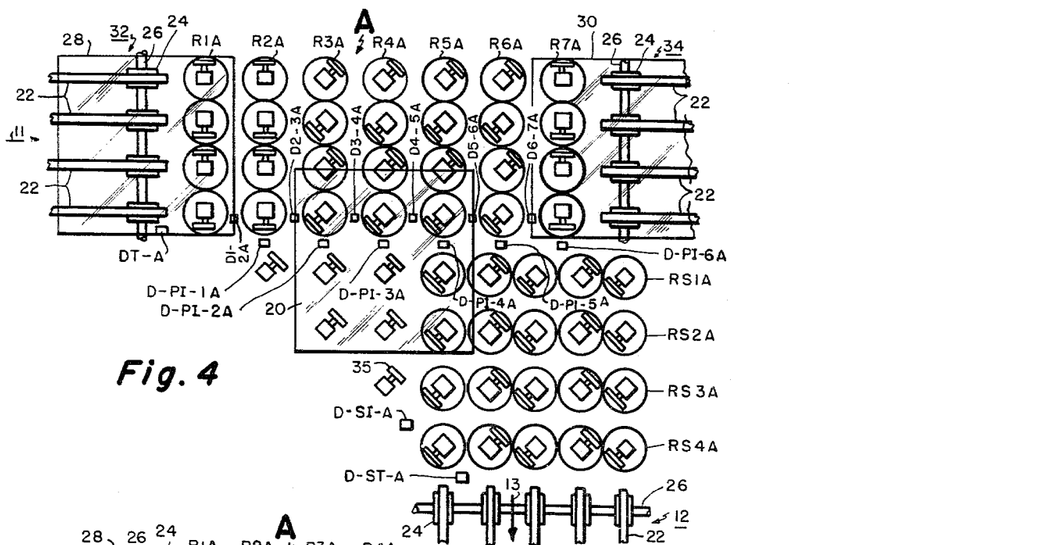
Figure 5:
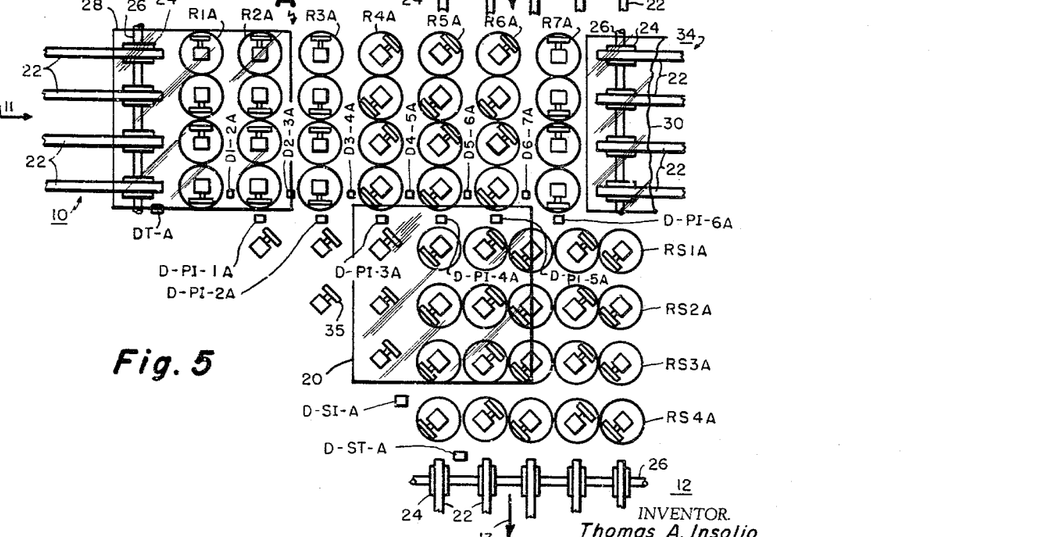
Figure 6:
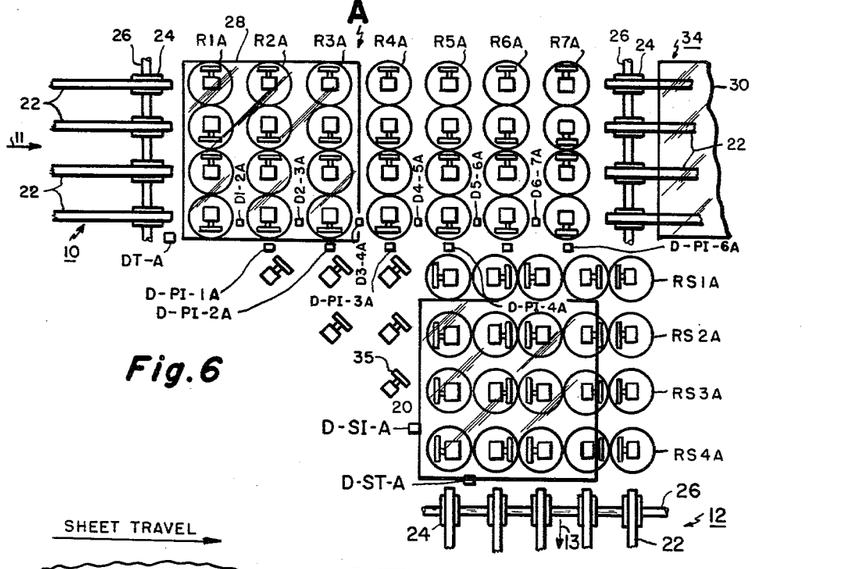

It may be seen by FIGURES 3 and 4 that the sheet 20 continues to proceed at a 45° angle toward the secondary conveyor and in FIGURE 4 has commenced to cover some of the swivel wheels of rows RS1A and RS2A, and in the position shown by FIGURE 5 has proceeded further onto row RS3A. In FIGURE 6 it may be seen that the sheet 20 is positioned entirely on rows RS2A, RS3A and RS4A and that the swivel wheels of rows RS1A, RS2A, RS3A and RS4A have rotated 45° so that they are now aligned with the direction of travel (arrow 13) of the secondary conveyor 12.

In the present embodiment each row of swivel wheels of rows R1A through R7A swivel to a 45° direction from the direction of the primary conveyor in unison and increase their speed simultaneously. The rows RS1A through RS4A are constructed in a similar manner to the rows R1A through R7A, but all four rows are caused to rotate and change speed simultaneously by the control means described hereinafter.

Figure 10:
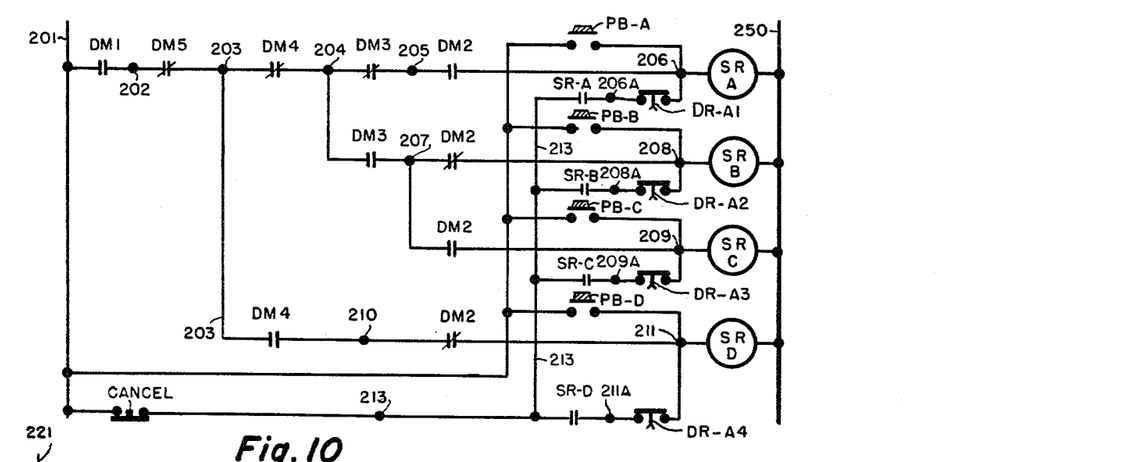
FIGURE 10 is a diagram of a circuit which when coupled with appropriate sensing devices is disposed to read coded marks placed on the glass sheets during inspection on the primary conveyor and which instructs and prepares later circuits and sensing devices in the automatic disposition of the sheets.

The control means consists of a plurality of detectors, illustrated in FIGURES 1 through 6 as DM1 through DM5, DS, DT–A, D–PI–1A through D–PI–7A, D1–2A through D6–7A, D–ST–A and D–SI–A, which in combination with the circuit means of FIGURE 10 effects the independent and combined swiveling of the swivel wheels of rows R1A through R7A and RS1A through RS4A in a manner to cause the transfer of a predetermined sheet (such as sheet 20 shown in FIGURES 2 through 6) designated for transfer in zone 18 to one of the secondary conveyors 12, 14 or 16 automatically and without disturbing the flow of other sheets along the primary conveyor.

Figure 7:
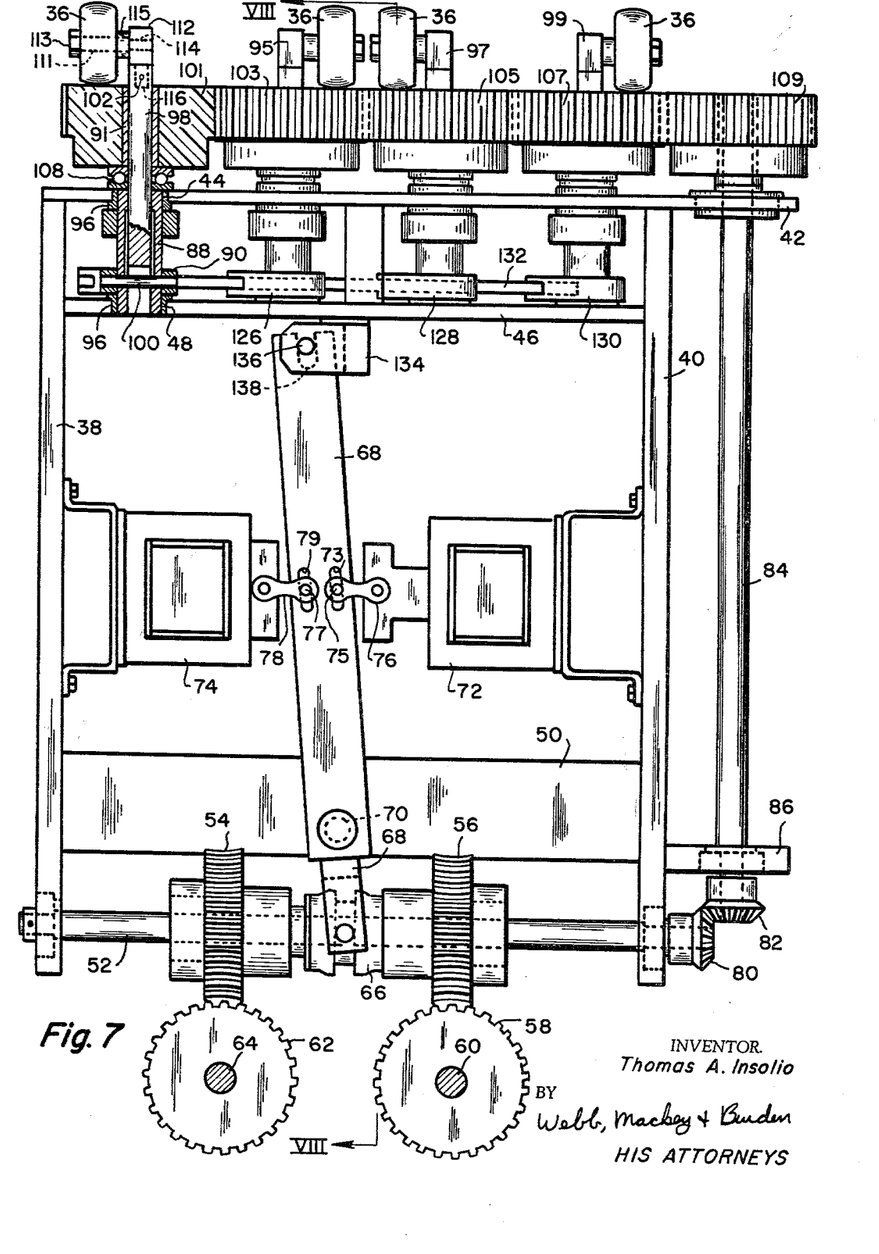
FIGURE 7 is a view in elevation and partially in section of the drive and swivel wheel mechanism of the conveyor apparatus of FIGURE 1 taken along the lines VII—VII thereof.
Figure 8:
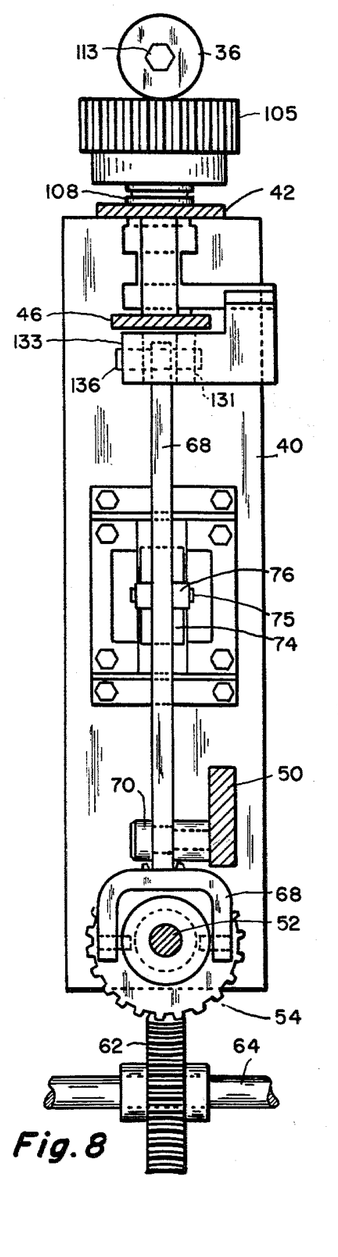
FIGURE 8 is a view in section in side elevation taken along the lines VIII—VIII of FIGURE 7, further illustrating the drive and swivel mechanism for the swivel wheels.
Figure 9:
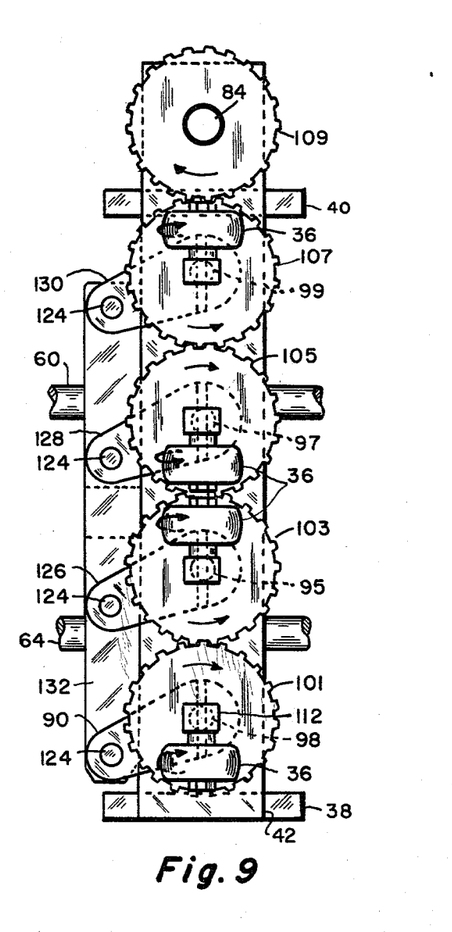
FIGURE 9 is a top plan view of transverse row R1A of swivel wheels illustrating the manner in which the swivel wheels are driven and the manner in which the swivel are turned 45° to transfer a sheet of glass.
Figure 10A:
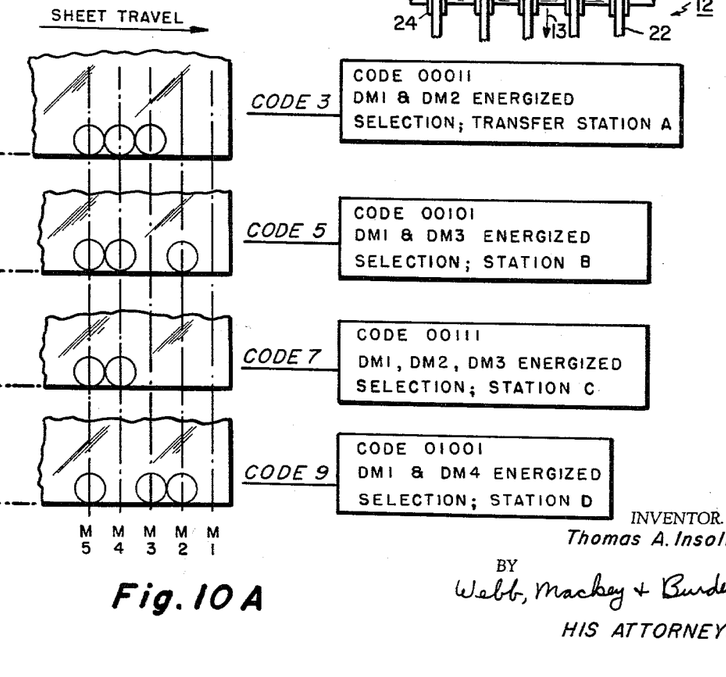
FIGURE 10A illustrates coded marks which are placed on the sheets as instructions for subsequent processing and which are decoded by the circuit of FIGURE 10.

The mechanical construction of row R1A is shown particularly by FIGURES 7 through 9. Since all of the rows R1A through R7A and RS1A through RS4A are similarly constructed, the description of FIGURES 7 through 9 should serve as a description of them all. The action of the plurality of detectors in controlling the swivel wheels is shown in FIGURES 10 and 10A.

All of the swivel wheels 36 of each of rows R1A through R7A are driven from a common drive means (see in particular FIGURE 7) and the wheels in each of rows RS1A through RS4A are driven from a second common drive means. Wheels 35 (FIGURES 1 through 6) do not require the swiveling and speed-up mechanism of the swivel wheels of rows R1A through R7A and RS1A through RS4A but are fixed at a 45° angle in the present embodiment, and are driven at a constant speed.

The transfer conveyor A includes a stand having vertical legs 38 and 40 and a top plate 42 (see FIGURE 7). The top plate 42 has a plurality of apertures 44 therein which are aligned transversely to the longitudinal axis of the main conveyor 10. There is a lower plate 46 extending parallel to the top plate 42 with apertures 48 that are aligned with apertures 44 in top plate 42. A lateral rib 50 is secured to vertical legs 38 and 40 adjacent their lower portion. The legs 38 and 40 rotatably support a horizontal shaft 52 which has positioned thereon in rotatable relation thereto high speed gear 54 and a normal speed gear 56. The normal speed gear 56 is in meshing relation with a gear 58 which is driven by normal speed drive shaft 60 so that gear 56 is arranged to be driven at the normal speed which will provide substantially the same speed for the swivel wheels as the primary conveyor 10. High speed gear 54 meshes with another gear 62 which is driven by shaft 64. Shaft 64 in the present embodiment is driven at a speed approximately equivalent to the speed of shaft 60 multiplied by the square root of 2 (approximately 1.414).

A friction clutch 66 is arranged to engage gear 54 or 56 to shaft 52 to thereby transmit rotation from either gear 54 or 56 to shaft 52. The friction clutch 66 is secured to a lever 68 which is pivotally connected to rib 50 at 70. Normal speed solenoid 72 is connected to vertical leg 40 and a high speed solenoid 74 is connected to the other vertical leg 38. The solenoids 72 and 74 are connected to lever 68 by means of links 76 and 78. The links 76 and 78 are pivotally attached to the lever 68 by means of pins 75 and 77 which project through elongated slots 73 and 79 formed in lever 68. Thus, by actuating solenoid 72, the lever 68 is pivoted about pivot point 70 to urge clutch 66 into engagement with gear 56 so that normal speed shaft 60 transmits rotation through gear 58 to gear 56 and then to shaft 52. When solenoid 72 is deenergized and solenoid 74 is energized, the shaft 68 is pivoted about pivot 70 to engage clutch 66 to gear 54 so that rotation of high speed shaft 64 is transmitted through gear 62 to shaft 52. The shaft 52 is connected by a pair of miter gears 80 and 82 to a vertical shaft 84 which is suitably supported in top plate 42 and a lower support member 86 for rotation therein. Thus, rotation of shaft 52 is transmitted through miter gears 80 and 82 to vertical shaft 84.

Referring to FIGURE 7, a sleeve 88 is rotatably mounted in apertures 44 and 48 by means of bushings 96. The sleeve 88 projects through a yoke 90 that is positioned between the top plate 42 and lower plate 46. A spindle 98 projects downwardly through the sleeve 88. The sleeve 88 is rigidly attached to both the spindle 98 and the yoke 90 by means of meshing apertures in each of these members through which a retaining pin 100 is projected. Thus it may be seen that rotation of the yoke 90 will cause sleeve 88 and spindle 98 to rotate.

Referring to both FIGURES 7 and 9, there are spur type gears 101, 103, 105, and 107 which are in meshing linear relation with each other and are rotatably supported on top plate 42 by means of thrust bearings 108 and are maintained in operative meshing relation by means of spindles 95, 97, 98 and 99. Gears 101 through 107 are rotatably mounted on the spindles 95, 97, 98 and 99 by means of bushings 91 (see gear 101 and spindle 98, FIGURE 7). The gears 101 through 107 are preferably formed of a fibrous material and are arranged to be driven by a drive gear 109 formed of substantially the same material and carried by vertical shaft 84. Thus gears 101 through 107 are driven in predetermined directions by means of gear 109 which is non-rotatably secured to shaft 84. Swivel wheels 36 are rotatably secured to a shaft 111 (see wheel 36 of spindle 98) by means of a retaining nut 113. Shaft 111 is threaded to a supporting member 112, as shown at 114. The supporting member 112, is in turn, secured to the spindle 98 by means of a shaft formed on the member 112 which projects into an appropriately formed recession in the spindle 98 as shown at 116. The supporting member 112 is secured against rotation on the spindle 98 by means of a roll pin 102. A cylindrical spacer 115 maintains the swivel wheel 36 in proper spaced relation with the spindle 98. The dimensions of the spindles 95, 97, 98 and 99 and swivel wheels 36 are such that the lower edge portion of wheels 36 are in abutting relation with the fibrous gears so that rotation of gears 101, 103, 105 and 107 is transmitted to wheels 36.

It should be noted that swivel wheels 36 mounted on spindles 95 and 99 are positioned on opposite sides of the center line of gears 103 and 107 when compared with the arrangement of swivel wheels 36 mounted on spindles 98 and 97 of gears 101 and 105. With this arrangement, all of the wheels 36 rotate in the same direction so that they will all propel the sheet-like material in the predetermined direction. The sheet-like material is arranged to bear on the upper circumferential edge of the swivel wheels 36. The wheels 36 are aligned in the normal linear position (as shown in FIGURE 7) in the direction that the sheet-like material is propelled, which is substantially the same as the direction of the main conveyor 10.

In FIGURES 7, 8 and 9, there is also shown a means to swivel the wheels to change the direction in which the sheet-like material is propelled. As previously described, the spindle 98 is connected to a rotatably mounted sleeve 88 and a yoke 90 by means of a retaining pin 100. Similarly, spindles 95, 97 and 99 are connected to like sleeves and yokes. The yokes of spindles 95, 97 and 99 are identified in FIGURES 7 and 9 at 126, 128, and 130, respectively. A connecting bar 132 is pivotally connected to each of the yokes 90, 126, 128 and 130 as shown at 124. It may be seen that horizontal movement of bar 132 simultaneously changes the relative direction of swivel wheels 36. The connecting bar 132 has a flanged depending portion 134 (see FIGURE 7) and a stub shaft 136 positioned between the flanges 131–133 (see FIGURE 8). The stub shaft 136 is positioned in a slot 138 of lever 68. With this arrangement the connecting bar 132 is moved horizontally by the pivotal connection to lever 68. The solenoids 72 and 74 simultaneously change the relative direction of swivel wheels 36 as well as the speed at which the gears 101, 103, 105 and 107 are driven. For example, as illustrated in FIGURE 7, the clutch 66 engages gear 56 to shaft 52 to transmit what may be termed "normal speed" to swivel wheels 36. At the same time the lever 68 positions the swivel wheels 36 so that they propel the sheet-like material in the "normal" direction or the direction of the primary conveyor 10. When actuated by means hereinafter described, solenoid 74, by means of link 78, will pivot lever 68 to disengage clutch 66 from gear 56 and engage clutch 66 to gear 54 to provide an increased speed for fibrous gears 101, 103, 105 and 107 through the drive mechanism previously described. Simultaneously, the lever 68 will move the bar 132 in a horizontal direction and yoke 90, 126, 128 and 130 will cause wheels 36 to swivel so that they will be positioned in a direction at a 45° angle to their "normal" direction (see the wheels 36 in row R1A in FIGURE 2). The "normal" direction of the wheels 36 of rows RS1A through RS4A is 45° from the direction of either the primary or secondary conveyor (see FIGURE 1).

As previously stated, each row of swivel wheels is caused to rotate in a given direction at a given speed in substantially an identical manner so that the description and drawings relating to FIGURES 7 through 9 substantially set forth the construction of all the rows R1A through R7A and RS1A through RS4A and also the corresponding rows of swivel wheels of transfer apparatus B and C of FIGURE 1. The control and speed of the swivel wheels, therefore, is effected in each instance by solenoids such as those identified as 72 and 74 in FIGURE 7.

In the inspection zone 18 (FIGURE 1), a selection of secondary conveyors 12, 14 or 16 is made. The selection may be made by employing a binary coded system of markings which is automatically "read" to make the proper selection of transfer station, or the selection may be made manually by pushing certain contact closing buttons as will hereinafter be described. In employing a binary coded system such as is used by the method and apparatus of the present invention, the markings themselves may be opaque, reflective, non-reflective, colored, or magnetic, depending upon the type of detectors used. In the present embodiment, five photoelectric detectors are employed. Each is indirectly actuated by a beam from its light source. The beam is reflected from the glass surface when no markings are present. For this description, non-reflective coatings are used to prevent reflection and hold the detector deenergized.

In FIGURE 1 and FIGURE 10A, the detectors are identified as DM1 through DM5. These detectors are positioned on the primary line, generally in the inspection zone prior to where the sheets of glass generally engage detector DS (see FIGURE 1). They are placed at a position and in a manner wherein indexed sheets of glass pass between the detectors at a predetermined longitudinal line running parallel to the direction of travel. The detectors are lined up in a parallel line and the sheets are coded along that line at predetermined distances. The marked locations of the glass sheet may be designated as positions M1 through M5 and such positions are read by each of the detectors DM1 through DM5 at the instant that the moving sheet locates its code positions M1 through M5 directly under detectors DM1 through DM5, respectively.

In a binary coded system such as employed in the present embodiment of five positions, there are possible a total of 25 or 32 different signals or counts including zero. This may be written as 00000=0 to 11111=31. If the positions are numbered M1 through M5 from right of left, then a zero in the first position (position M1 is coated) means that the first detector DM1 receives no light and is deenergized; also, a 1 at the first position (position M1 is not coated) means that detector DM1 receives reflected light and is appropriately energized. A reading of 00000 would mean that detectors DM1 through DM5 are all deenergized, therefore either there is no glass present or code positions M1 through M5 on the glass are all coated and their respective detectors would receive no signals. A reading of 11111 would mean that detectors DM1 through DM5 are all energized, therefore uncoated (essentially unmarked) glass is under all five detectors.

In the binary coded system presently employed, there are only seven possible codes that are unique for the instant when the five detectors are directly over their respective code positions. Of the code numbers, the one farthest to the right is always "1" (there is no coating to interfere with reflection) and the detector DM1 must be energized on any sheet being coated for automatic disposition to specific secondary lines 12, 14 and 16 on the primary conveyor 10. In the present binary coded system, the position 5 at the left must always be a zero (coated), or a contact DM5 (202–203) (see FIGURE 10) will open at the precise instant DM1 through DM4 are over their respective code areas M1 through M4. Consequently, the seven code numbers which may be employed are the following:

| Code: | Code number |
|---|---|
| 00001 | 1 |
| 00011 | 3 |
| 00101 | 5 |
| 00111 | 7 |
| 01001 | 9 |
| 01011 | 11 |
| 01101 | 13 |
| 01111 | 15 |

FIGURE 10A shows four specific coded markings for glass sheets. The positions are identified as codes 3, 5, 7 and 9. These code numbers correspond to four of the binary numbers set forth above and are the four numbers or codes presently selected for the operation of the present system.

When electrical current is supplied to the leads 201 and 250 of the circuit of the diagram of FIGURE 10 and a sheet has been given code 3 (FIGURE 10A) by coating three of five predetermined positions M5, M4 and M3 with a non-reflective substance, the sheet may be indexed in the conventional manner on the primary conveyor 10 and as it is conveyed under the detectors DM1 through DM5, the detectors may be activated when the positions M1 through M5 coincide with the detectors.

The glass sheets, such as sheet 20 (FIGURE 10A), are coded so that the code marks pass beneath the detectors DM5 through DM1 in an in-line fashion and each detector senses each code position M1 through M5 respectively. In the present embodiment, the code marks are placed along one edge of the sheet adjacent its leading edge. Each sheet is conveyed continuously beneath the detectors DM5 through DM1 so that director DM5 first "reads" code position M1, then position M2 etc. As shown by the diagram of FIGURE 10, contact DM1 (201–202) is open and will remain open until detector DM1 senses reflected light. Since detector DM1 is the last to encounter a code position and this position (M1) is adjacent the leading edge of the sheet, the contact DM1 (201–202) remains open so that regardless of the actions of the other detectors, the circuit of FIGURE 10 is not activated until detector DM1 senses code position M1 and at this time each of the other sensors DM5 through DM2 is positioned to sense their respective code positions M5 through M2. It should also be noted that contact DM5 (202–203) is closed when detector DM5 does not sense light. However, when code position M5 passes beyond detector DM5 the contact DM5 (202–203) will remain open because detector DM5 will continue to receive reflected light from the surface of the glass. Consequently, the circuit of FIGURE 10 will be activated when each of the detectors DM5 through DM1 is positioned above each of the respective code positions M5 through M1.

It may be seen that when each detector, DM5 through DM1, is positioned over their corresponding code positions M5 through M1, detector DM1 will sense light since position M1 is not coated and consequently contact DM1 (201–202) will close. Detectors DM5, DM4 and DM3 will not sense light so that the contacts DM5 (202–203), DM4 (203–204) and DM3 (204–205) will remain closed. The detector DM2 will sense light since position M2 is not coated, hence contact DM2 (205–206) closes to energize relay SRA (206–250) which locks in the circuit by closing contact SRA (213–206A). Since detectors DM3 and DM4 do not sense light, contacts DM3 (204–207) and DM4 (203–210) remain open, none of the other relays SRB (208–250), SRC (209–250) or SRD (211–250) are affected.

It may be readily seen that were code 5 employed, the detectors DM5, DM4 and DM2 would be prevented from sensing light while detectors DM1 and DM3 would sense light. In this event, contacts DM1 (201–202), DM5 (202–203), DM4 (203–204), DM3 (204–207) and DM2 (207–208) would close to energize relay SRB (208–250) which would lock in the circuit by closing contact SRB (213–208A). Contacts DM2 (205–206), DM2 (207–209) and DM4 (203–210) would remain open so that none of the other relays would be activated. It may be readily seen that codes 7 or 9 would activate relays SRC (209–250) and SRD (211–250) in a similar manner.

To simplify the explanation of the circuit diagram, the diagram has been divided into five separate figures (FIGURES 10, 10B, 10C, 10D and 10E). The circuit of each figure performs a specific function in conjunction with the circuits of the other figures to effect the transfer of preselected sheets from the primary conveyor 10 to one of the secondary conveyors 12, 14 or 16. The energizing of relay SRA (206–250) prepares the pulsating circuit portion of the circuit diagram shown by FIGURE 10B for subsequent functioning by closing the contacts SRA (201–217). Closing these contacts prepares the counting circuits as will be described hereinafter.

It may be seen that the method of coding the sheets in the inspection zone may be bypassed and the secondary conveyor may be manually selected by pressing any of buttons PB–A (201–206), PB–B (201–208), PB–C (201–209), or PB–D (201–211). The manual closing of such contacts, as will be observed, will energize the respective relays SRA (206–250) through SRD (211–250), which will, in turn, lock them into the circuit through their respective contacts, such as contact SRA (213–206).

Figure 10B:
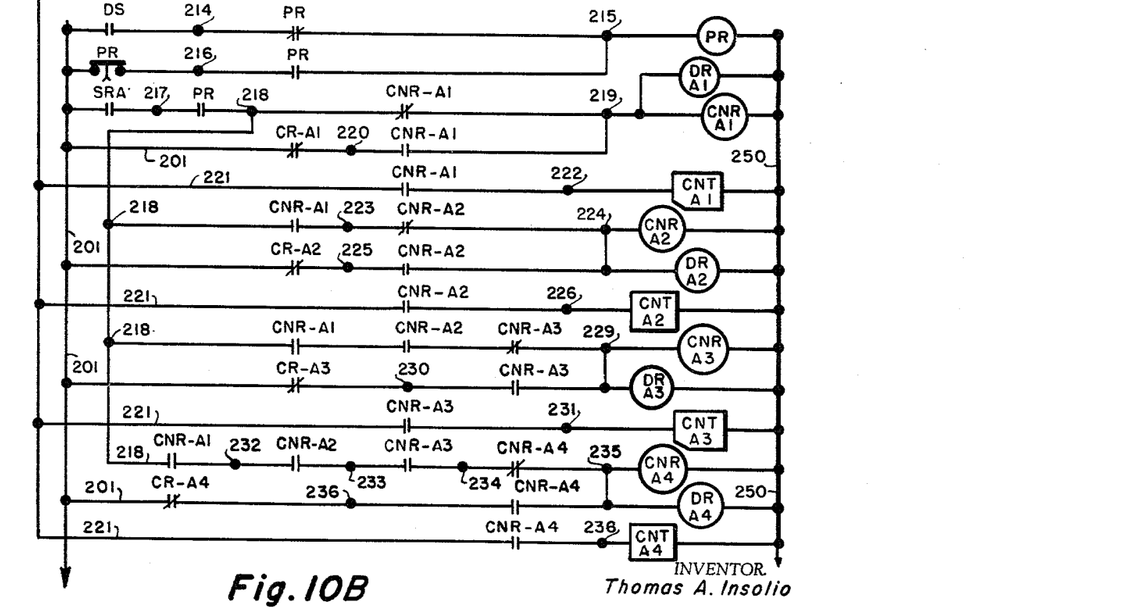
FIGURES 10B–10E are circuit diagrams and continuations of the circuit of FIGURE 10 which act in response to the sensing devices of FIGURES 1–6, 10 and 10A to transfer preselected sheets from the primary conveyor line 10 onto the secondary conveyor line 12 of FIGURE 1.
Figure 10C:
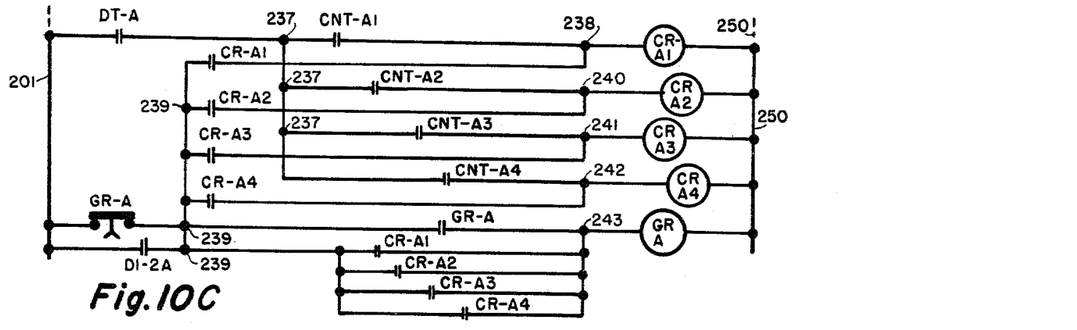

When the sheet starts to emerge from the inspection zone, detector DS senses the leading edge (see FIGURE 1). In FIGURE 10B, it may be seen that when the detector DS senses the leading edge, contact DS (201–214) closes to energize PR (215–250) through closed contact PR (214–215). Energization of relay PR (215–250) causes contact PR (216–215) to close before contact PR (214–215) opens to isolate the relay coil PR (215–250) from detector contact DS (201–214) and hence detector contact (201–214) opens so that detector DS may detect the leading edge of subsequent sheets passing from the inspection zone 18 of primary conveyor 10. As may be seen, closed relay PR (215–250) is locked into the circuit through contact PR (216–215) through a time delay contact PR (201–216), the function of which will be explained hereinafter. When relay PR (215–250) is energized, contact PR (217–218) closes and since contact SRA (201–217) has already closed, relays CNR–A1 (219–250) and DR–A1 (219–250) are energized. After relay PR (215–250) has caused contact PR (217–218) to close and the relays CNR–A1 and DR–A1 (219–250) have been energized, contact DR–A1 (206A–206) after a short delay opens to deenergize relay SRA (206–250) and return the circuit of FIGURE 10 to its original condition for performing its function of instructing the circuitry for disposition of subsequent glass sheets passing under detectors DM1 through DM5 or for the manual operation of push buttons PB–A through PB–D. When relay SRA (206–250) is deenergized, contact SRA (201–217) opens.

After a preset time delay calculated to hold relay PR (215–250) in the circuit until the counter relay CNR–A1 (219–250) has been energized, the timer contact PR (201–216) opens to deenergize the relay PR (215–250), which causes contact PR (214–215) to close and contacts PR (216–215) and PR (217–218) to open.

When contacts SRA (201–217) and PR (217–218) were closed, as previously stated, the relay coil CNR–A1 (219–250) was energized. The energizing of relay CNR–A1 (219–250) causes contacts CNR–A1 (220–219) to close, before contact CNR–A1 (218–219) opens, to hold relay coil CNR–A1 (219–250) into the circuit before isolating the coil CNR–A1 (219–250) from the SRA (201–217) and PR (217–218) contacts. Contacts CNR–A1 (221–222) connect the counter CNT–A1 (222–250) to a pulsating circuit 221. The pulsating current from circuit 221 is disposed to advance the counter CNT–A1 (222–250) at the rate of one pulse per inch of sheet travel. Contact CNR–A1 (218–223) closes in the circuit and prepares the circuit for a second sheet of glass in the inspection zone to be coded for transfer to the secondary conveyor 12 or to be transported through transfer apparatus A. The relay coil CNR–A2 (224–250) will not be energized because the contacts SRA (201–217) and PR (217–218) have opened. If another sheet is selected to be transferred to secondary conveyor 12 by transfer apparatus A while the previous sheet is en route, then the contacts SRA (201–217) and PR (217–218) will energize the coil CNR–A2 (224–250). In this event, counter CNT–A2 (226–250) will be energized since contact CNR–A2 (221–226) will close.

Returning to the first sheet of glass which through its code 3 has caused the counter CNT–A1 (222–250) to be energized when it caused detector DS at the conclusion of the inspection zone to close contact DS (201–214), when this sheet is conveyed the distance from detector DS to detector DT–A (see FIGURE 1) at the entry of the transfer apparatus A, the counter CNT–A1 (222–250) (FIGURE 10B) has received the preset number of pulses designed to register the distance travelled between the detector DS and the detector DT–A, its contacts are then actuated. Contact CNT–A1 (237–238) (see FIGURE 10C) closes to energize the relay CR–A1 (238–250) when the leading edge of sheet is detected by detector DT–A (FIGURE 1) to close contact DT–A (201–237). Contact CR–A1 (239–238) closes to hold the relay coil CR–A1 (238–250) in the circuit. Contact CR–A1 (201–220) (see section 2 of FIGURE 10) opens to deenergize relay CNR–A1 (219–250). Contact CNR–A1 (221–222) then opens to deenergize the counter CNT–A1 (222–250). Contact CNT–A1 (237–238) FIGURE 10C) now opens to isolate CR–A1 from DT–A. When relay CR–A1 (238–250) was energized, contact CR–A1 (239–243) closed to energize group relay GR–A (243–250). Group relay GR–A(243–250) locks into the circuit by closing contact GR–A (239–243).

A subsequent sheet coded in the inspection zone with code 3, as the one previously described which energized counter CNT–A2 (226–250), will energize relay CR–A2 (240–250) by causing contact CNT–A2 (237–240) to close when the detector DT–A detects the presence of this sheet simultaneously near the conclusion of the count of counter CNT–A2 (226–250) (FIGURE 10B) to cause the relay CR–A2 (240–250) (FIGURE 10C) to be locked into the circuit through contact CR–A2 (239–240) and to close contact CR–A2 (239–243). When the relay CNR–A2 (224–250) (FIGURE 10B) was energized to close contact CNR–A2 (221–226) and cause counter CNT–A2 (226–250) to effect a pulsating count, contact CNR–A2 (218–229) was also caused to close in preparation for a third sheet being given code 3 in the inspection zone 18 of the primary conveyor while the first and second sheets were en route to transfer station A between detectors DS and DT-A (FIGURE 1). Contact CNR-A1 (218-229) closed previously when relay CNR-A1 (219-250) was locked into the circuit. As previously mentioned, however, each time a sheet has passed detector DS, both the relay PR (215-250) and the relay SRA of FIGURE 10 have been deenergized so as to open contacts SRA (201-217) and PR (217-218) to isolate conductor 218 from the circuit. When (and if) a third coded sheet activates the reley SRA (206-250) in the manner previously described to close the contact SRA (201-217), and the third sheet is detected by detector DS to close the contact DS (201-214) and energize the relay PR (215-250) in the manner previously described, the relay CNR-A3 (229-250) is then energized and locked into the circuit through contact CNR-A3 (230-229) and cause contact CNR-A3 (221-231) to energize the counter CNT-A3 (231-250) to have the same effect on the circuit of FIGURE 10C as the sheets 1 and 2 had when they arrived at detector DT-A and were ready for transfer to secondary conveyor 12. It can be readily seen that a fourth sheet could energize the counter CNT-A4 (236-250) in a similar manner; however, if the first sheet arrives at the transfer point (detected by detector DT-A) before the fourth sheet is detected by DS, then the fourth sheet will reenergize contact CNR-A1.

It may also be seen that when the leading edge of the first sheet given code 3 is detected by detector DT-A, the contact CR-A1 (239-243) closes. If the second counter is in action, contact CR-A2 (239-243) closes when the leading edge of the second sheet is detected by the detector DT-A, etc. In any event, the group reley GR-A (243-250) is energized and closes contact GR-A (201-244) (see the circuit diagram of FIGURE 10D).

Timer contact GR-A (201-239) is normally closed so that an electrical connection is maintained between leads 201 and 239 which, of course, is essential to lock in the relays CR-A1 (238-250), CR-A2 (240-250), etc. When relay GR-A (243-250) is energized, timer contact GR-A (201-239) opens since the sheet to be transferred passes over detector D1-2A (FIGURE 1) and contact D1-2A (201-239) closes to complete the circuit. It is necessary for contact GR-A (201-239) to open so the aforementioned relays [including relay GR-A (243-250)] may be subsequently deenergized. When the trailing edge of sheet, of the last sheet of a group of sheets is positioned on the swivel wheels and is no longer detected by detector D1-A2, contact D1-2A (201-239) opens. The timer contact GR-A (201-239) delays opening, however, after relay GR-A (243-250) has been energized, to allow the leading edge of each sheet to travel the distance between detectors DT-A and D1-2A. In this manner, the group relay GR-A (243-250) and the relays CR-A1 (238-250), CR-A2 (240-250), etc. are not deenergized until the appropriate sheet or last sheet of an appropriate group of sheets is no longer detected by detector D1-2A.

Figure 10D:
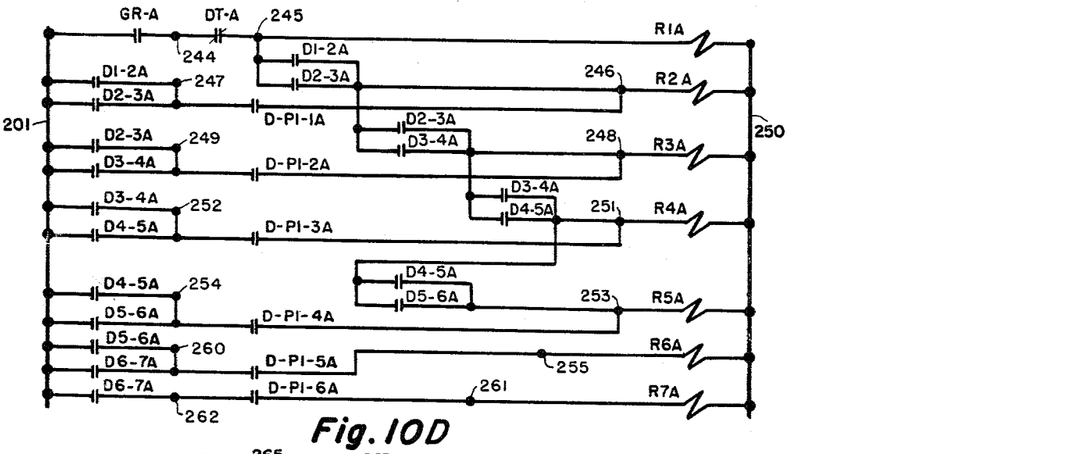
Figure 10E:
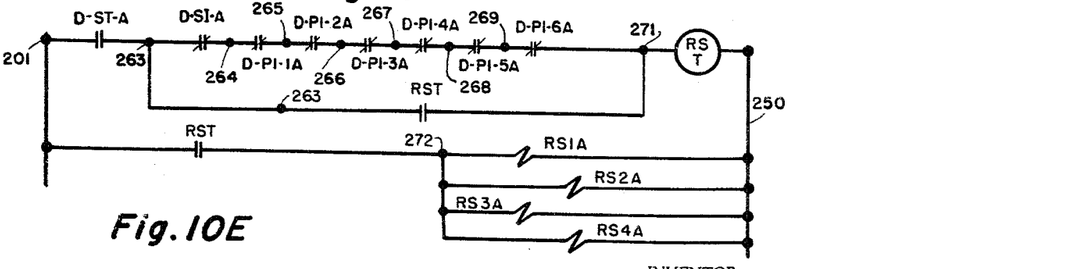

Solenoids R1A through R7A, as depicted on the diagram of FIGURE 10D, control solenoids such as 72 and 74 of the apparatus of FIGURE 7. It may be assumed that each of the rows R1A through R7A posesses solenoids similar to solenoids 72 and 74 of the apparatus described by FIGURE 7. For example, when solenoid R1A (245-250) is energized, solenoid 74 of row R1A is energized and solenoid 72 of row R1A is deenergized. Each of the solenoids as shown in these rows in FIGURES 1 through 6 is in the postions shown wherein the clutch 66 is engaged with the gear 56 driven by normal speed shaft 60 so that the swivel wheels 36 are driven at a speed similar to the speed of primary conveyor 10. Also, the solenoid 72 being extended causes the lever 68 to be pivoted in such a manner as to position the pin 136 of lever 68 so that the horizontal lever 132 is in such a position as to maintain the yokes 90, 126, 128 and 130 in a position where the wheels 36 are aligned with the primary conveyor 10 in their so-called "normal" position so as to convey sheets along the primary conveyor without interrupting either their speed or direction. Activation of any of the solenoids R1A through R7A of the rows R1A and R7A of wheels has the effect of extending solenoid 74 and retracting solenoid 72 of each of the rows to cause the clutch 66 to engage the gear 54 driven by accelerated speed shaft 64 so as to speed up the wheels 36 to a speed of approximately the speed of the primary conveyor multiplied by the square root of 2 and also to cause the lever 68 to pivot and carry with it pin 136 to readjust the horizontal lever 132 in a manner to rotate the yokes 90, 126, 128 and 130 in a manner as to cause all of the swivel wheels 36 to swivel to a 45° angle as well as speed up (see in particular rows R1A through R4A of FIGURE 2).

To effect a uniform movement laterally of the primary conveyor at a 45° angle from the direction of the primary conveyor, it is necessary that the sheet 20 (FIGURES 2 through 6) be positioned and supported entirely by swivel wheels 36 and that all the swivel wheels in contact with the sheet 20 swivel to a 45° angle simultaneously. Otherwise, the sheets to be transferred will be scratched and will rotate non-uniformly so that they are not positioned properly on the secondary conveyor for further indexing and cutting operations.

Accordingly, when the edge of the sheet is detected by the detector DT-A, the normally closed contact DT-A (244-245) opens. Previously it has been shown that the group contact GR-A (201-244) closed at the conclusion of the count of counter CNT-A1 (222-250) and upon initial contact of the leading edge of the first sheet designated for secondary conveyor 12 which was detected by detector DT-A in accordance with the circuit of FIGURE 10C. Accordingly, although the contact GR-A (201-244) is closed, solenoid R1A is not activated because of the open contact DT-A (244-245). As the sheet 20 passes onto the apparatus A and passes over row R1A, it is detected by the detector D1-2A. At this point contacts D1-2A (245-246) and O1-2A (201-247) close. However, since contacts DT-A (244-245) and D-PI-1A (201-246) are open, neither solenoid R1A nor solenoid R2A is energized. After the sheet 20 has passed over row R2A and has been detected by detector D2-3A (see FIGURE 1), the contacts D2-3A (245-246) and D2-3A (201-246) close; however, as previously described, contact DT-A (244-245) remains open since the detector DT-A still detects glass and contact D-PI-2A (201-246) remains open so that none of the solenoids are energized. Contact D2-3A (245-248) and contact D2-3A (201-249) also close, but since the contacts DT-A (244-245) and D-PI-2A (201-248 remain open, none of the solenoids are activated. After the sheet 20 has cleared the detector DT-A and now is contacted by the swivel wheels of row R1A, R2A and R3A, and the trailing edge is no longer detected by detector DT-A, the sheet is entirely supported by the swivel wheels of the first three rows (R1A, R2A and R3A) and contact DT-A (244-245) closes and energizes solenoids R1A (245-250), R2A (246-250) and R3A (248-250) which simultaneously effects pivoting of levers such as lever 68 of FIGURES 7 through 9 in such rows to pivot the swivel wheels 36 of all three rows simultaneously to a 45° angle in the manner shown in FIGURE 2 and to increase the speed of swivel wheels 36 to that of high speed shaft 64. When the trailing edge of the sheet passes row R1A and detector D1-2A ceases to detect the sheet, contact D1-2A (201-239) (see FIGURE 10C) opens to deenergize the group relay GR-A (243-250) and relay CR-A1 (238-250). Contact GR-A (201-244) (FIGURE 10D) then opens to deenergize solenoid R1A. The transverse row R1A then returns to its normal position, or solenoid 72 is energized and solenoid 74 of FIGURE 7 is deenergized to cause pivot arm 68 to pivot to the left and assume the position as shown by FIGURE 7 wherein the clutch 66 contacts the gear 56 and transmits normal speed rotation from shaft 60 to swivel wheels 36 while simultaneously pivoting the pin 136 and hence the lever 132 to rotate the yokes 90, 126, 128 and 130 to cause swivel wheels 36 to reassume their original and normal position in line with primary conveyor 10. In the meantime, the sheet has moved laterally and has been detected by detectors D–PI–1A, D–PI–2A and D–PI–3A (see in particular FIGURE 3). Hence the contacts shown in FIGURE 10D, D–PI–1A (201–246), D–PI–2A (201–248) close so as to maintain solenoids R2A and R3A in their activated conditions since the contacts D2–3A (201–246) and D2–3A (201–249) remain closed. Consequently, although row R1A returns to alignment with the primary conveyor 10, the rows R2A and R3A remain pivoted and at their increased speed. When the sheet 20 was detected by detector D3–4A, it caused contacts D3–4A (201–248) and D3–4A (201–252), D3–4A (245–248) and D3–4A (245–251) to close. Since the sheet 20 was detected by detector D3–4A before the contact GR–A (201–245) opened the solenoid R4A (248–250) was energized and the swivel wheels of row R4A swiveled and increased in speed prior to their being contacted by sheet 20 (see FIGURE 2). The lateral movement of sheet 20 caused the sheet 20 to be detected by detector D–PI–3A and contact D–PI–3A (201–251) is closed so that solenoid R4A (251–250) remains activated to hold the swivel wheels 36 of row R4A at the 45° angle and increased speed so that the sheet will continue both movement along the primary conveyor at substantially the same speed so as to maintain its proper proportional distance between the preceding sheet 30 and the trailing sheet 28, while simultaneously moving towards secondary conveyor 12.

As may be seen, particularly by FIGURES 3 and 4, wheels 35 which do not swivel but are fixed at a 45° angle between the junction of the primary conveyor and the secondary conveyor in the area of the transfer apparatus A, and which are preferably maintained at a constant speed that is approximately equal to the speed of the primary conveyor multiplied by the square root of 2, serve to receive the sheet 20 and support it in both its horizontal and lateral movement from the primary conveyor 10 to the secondary conveyor 12.

When the trailing edge of the sheet 20 is no longer detected by either D1–2A or D2–3A, solenoid R2A is deenergized since the contacts D1–2A (201–247) and D2–3A (201–246) are open and the second row of wheels R2A returns to normal and reduces speed to that of the primary conveyor 10. The sheet continues to move 45° from the primary conveyor towards the secondary conveyor and onto rows RS1A through RS4A of the transfer apparatus A. As shown by FIGURE 4, the sheet here has already contacted two of the swivel wheels of rows RS1A and RS2A of the apparatus A that are positioned in conjunction with the secondary conveyor. These rows RS1A through RS4A are normally directed 45° from the direction of the primary and secondary conveyors and the normal position of their levers 68 that correspond to the lever 68 of rows R1A through R7A as shown by the embodiments of FIGURE 7, is such that their solenoids 74 are extended and the solenoids 72 are retracted so that the lever 68 is pivoted in such a manner that the swivel wheels 36 are oriented 45° and the clutch 66 engages the gear 54 so as to be driven at the accelerated speed of the primary conveyor multiplied by the square root of 2.

As sheet 20 passes onto the rows RS1A through R14A, it is detected by detector D–SI–A and contact D–SI–A (263–264) (see FIGURE 10E) opens. It should be noted that relay RST (271–250) is isolated from conductor 201 so long as the contact D–SI–A (263–264) remains open. Also, the contacts D–PI–1A (264–265), D–PI–2A (265–266), D–PI–3A (266–267), D–PI–4A (267–268), D–PI–5A (268–269) and D–PI–6A (269–271) remain open to further isolate relay RST (271–250) from conductor 201 so long as the respective detectors, adjacent the primary conveyor, (D–PI–1A through D–PI–6A) detect the presence of sheet. Once the sheet has moved beyond the range of detectors D–PI–1A through D–PI–6A and its trailing edge (in respect to the primary conveyor) is no longer detected by the detector D–SI–A, all of the contacts D–SI–A (263–264), D–PI–1A (264–265), D–PI2A (265–266), D–PI–3A (266–267), D–PI–4A (267–268), D–PI–5A (268–269) and D–PI–6A (269–271) are closed and when the glass sheet 20 is detected by detector D–ST–A due to its lateral motion (in respect to the primary conveyor), the contact D–ST–A (201–263) closes and the relay RST (271–250) is energized and is locked into the circuit through contact RST (263–271). The energization of relay RST (271–250) closes contact RST (201–272) which effects energization of all of the solenoids RS1A through RS4A. Accordingly, the solenoids corresponding to solenoids 72 and 74 of FIGURES 7 through 9 of the mechanisms of rows RS1A through RS4A are activated to cause the swivel wheels 36 of these rows to rotate 45° and align themselves with the direction of travel of the secondary conveyor 12 and to assume the speed of the secondary conveyor by appropriately pivoting a lever such as lever 68 of FIGURES 7 through 9. It may be seen that the sensing device D–ST–A continues to contact the sheet 20 so that contact D–ST–A (201–263) remains closed and relay RST (271–250) remains locked into the circuit until the sheet has passed completely off of the rows RS1A through RS4A and the trailing edge of the sheet is no longer engaged by detector D–ST–A at which time contact D–ST–A (201–263) opens to deenergize relay RST (271–250) to open the contact RST (201–272) and deenergize all of the solenoids RS1A through RS4A to effect a reversal in energizing the solenoid 74 and deenergizing the solenoid 72 that correspond to the apparatus of FIGURE 7 so that the corresponding levers 68 are pivotally rotated about pivot 70 so as to engage clutch 66 with gear 54 and drive the swivel wheels 36 at approximately the normal speed of the primary conveyor 10 multiplied by the square root of 2, while simultaneously effecting a swiveling motion to the swivel wheels 36 so that they reassume their position as shown in FIGURES 1, 2 and 3.

As previously described, in many instances where sheets of material are transferred from primary conveyors to secondary conveyors, such as where sheets of glass are being scored or cut and broken, it is frequently desirable that the sheets be transferred laterally so that they are indexed in a manner wherein they proceed on the secondary conveyor with their longer dimensions transverse or parallel to their direction of travel. The reason for this is that these sheets are actually strips which have been cut on the primary conveyor and now must be again cut on the secondary conveyor into still smaller panes, in which event it is desirable to have the sheet indexed on the secondary conveyor with its long dimension being positioned for subsequent scoring. As may be readily observed, such indexing and positioning of the transferred strips are accomplished by the transfer apparatus of the present invention, as is particularly illustrated in FIGURES 2 through 6 wherein a glass sheet 20 is shown to be transferred laterally without rotation. For this reason, it is frequently highly desirable that the secondary conveyor project laterally from the primary conveyor at an angle of approximately 90°. In the employment of this type of arrangement, the swivel wheels 36 of rows RS1A through RS7A should be arranged to swivel to an angle from the direction of travel of the primary conveyor of approximately 45°. With this arrangement, the swivel wheels of the rows RS1A through RS4A can be arranged to swivel an equal amount to complete transfer of the sheet from the primary to the secondary conveyor, and the sheet or strip is appropriately indexed in the desired manner.

It will be appreciated that in the apparatus shown by FIGURE 1 sheets of glass will normally be indexed along the edge of the primary conveyor corresponding to the secondary conveyor to which they are designated for transfer. For example, sheets being transferred to secondary conveyors 12 and 14 by apparatus A or B will be indexed along the right side of the primary conveyor 10 (from the direction of travel along the conveyor 10). Where such sheets are to be transferred laterally to a secondary conveyor in the opposite direction, such as secondary conveyor 16, the sheets must be indexed along the left side of the primary conveyor 10 between the apparatus B of secondary conveyor 14 and apparatus C of secondary conveyor 16. Such indexing means are well known and are shown generally in FIGURE 1 to consist of skewed rolls 311 which cause the sheets to cross the primary conveyor and abut and index on a belt 313 traveling at the speed of the primary conveyor.

In summary, the conveyor system of the present invention is one by which a horizontally conveyed sheet may be transferred from a primary conveyor to a secondary conveyor without interrupting a continuous in-line flow of sheets along the primary conveyor. This is accomplished by positioning transverse rows of wheels between conveyor units of the primary conveyor and rows of similar wheels transverse to the secondary conveyor between the primary and secondary conveyors. All of the wheels are located at the desired point of transfer, the former being somewhat "upstream" from the latter. The wheels are all driven so that the rows in the primary conveyor line can act as a conveyor unit in that line for sheets not being transferred. When a sheet to be transferred is positioned entirely on the rows of wheels in the primary line, they are made to swivel to an intermediary angle between the primary and secondary conveyors and also speed up so that a sheet being transferred is "angled" from between the adjacent moving sheets without interrupting flow on the primary line. The swivel wheels of the secondary conveyor are positioned at a complementary angle and run at a complementary speed to receive the sheets from the primary conveyor. Once the sheet is clear of the primary conveyor, these wheels swivel to convey the sheets onto the secondary conveyor and preferably slow down to ordinary conveyor speed.

Partciularly desired swivel apparatus for the wheels is shown by the embodiments of FIGURES 7, 8 and 9, as described above. Particularly desirable utilization of sensing devices and circuitry to accomplish transfer for preselected sheets and, indeed, for providing a coding system which may be electronically utilized is depicted by the circuit diagrams of FIGURES 10, 10A, 10B, 10C, 10D, and 10E, as described above.

It is to be understood that although the apparatus arranged in the manner described above is the preferred embodiment of the present invention, this embodiment is set forth to illustrate the present invention and does not limit the invention to the exact arrangement set forth. Although the secondary conveyor such as secondary conveyors 12, 14 or 16 preferably proceed at a 90° angle from the primary conveyor 10, such angle need not be precise or exact. Other indexing means can be employed to orient the transferred sheets. The swivel wheels of rows R1A through R7A may be constructed in a manner to compensate for the fact that the secondary conveyor proceeds laterally from the primary conveyor at an angle other than that of 90°. A secondary conveyor may extend at an angle of 45° from the direction of travel of the primary conveyor. In this event, rows RS1A through RS4A may not be required, or, if present, need not swivel, and wheels 35 would be all that would be required to receive the sheets being transferred from the primary conveyor to the secondary conveyor. Although the highly preferred embodiment of the present invention is that the secondary conveyors extend laterally from the primary conveyors at an angle of approximately 90°, and that the swivel wheels of rows R1A through R7A increase their speed from that of the primary conveyor to the speed of approximately the speed of the primary conveyor multiplied by the square root of 2 (about 1.414 times the speed of the primary conveyor) so as to transfer a preselected sheet from between non-preselected sheets without affecting the spacing therebetween, it is, of course, possible to transfer sheets by the apparatus of the present invention by merely providing sufficient spacing between the sheets to allow such transfer at a constant speed. It will be obvious that the latter method will be considerably less efficient since it is always preferable to maintain as steady a flow of sheets of material as is possible, particularly on a primary line where secondary lines may be constructed to adjoin such production.

It is also understood that the exact number of swivel wheels in each row of wheels or the specific number of rows employed is not of significance and different sized sheet products will have varying requirements in this respect.

Although my invention is illustrated above by the transfer of glass sheets from a primary conveyor to a secondary conveyor, such method and apparatus are obviously amendable to the transfer from one conveyor to another of materials other than glass. For example, the apparatus and method of this invention may be employed for the conveying and handling of metals and plastics as well as glass. It is equally obvious that my apparatus and method as described may be employed to transfer articles other than sheet or strip materials and may be adapted to the transfer of any shaped article that is capable of being conveyed on an in-line conveyor system.

I claim:

1. In a transfer conveyor, the combination comprising a plurality of wheels supported with their central axes parallel and in substantially the same horizontal plane, said wheels arranged in a plurality of parallel rows, drive means for driving all of said wheels in each row comprising a plurality of spur-type gears in meshing relation with each other and positioned in substantially the same horizontal plane, said wheels arranged with their circumferential edge portion abutting said gears so that the rotation of said gears drives said wheels in a predetermined direction relative to said central axis, said wheels being positioned to convey articles in a first direction transverse to said rows and means to rotate the axis of all of said wheels in each of said rows to thereby convey a preselected article at an angular direction to said first direction.

2. In a transfer conveyor as set forth in claim 1, in which each of said wheels is supported on a separate horizontal shaft in rotatable relation therewith, each of said horizontal shafts connected to a vertical spindle, connecting means associated with said spindles and arranged to rotate all of said spindles in a row predetermined distance so that said wheels in said row convey said preselected article in an angular direction to said first direction.

3. Transfer apparatus for supporting and conveying sheets in alternate directions, comprising:
 (A) a supporting frame;
 (B) a plurality of vertical spindles rotatably mounted on said frame extending upwardly therefrom and arranged in parallel transverse rows;
 (C) connecting means connecting the spindles of each row so that the spindles of each row rotate in unison;
 (D) a plurality of swivel wheels, one each horizontally mounted to the top of each said spindle and said swivel wheels in each said rows being disposed to rotate in parallel vertical planes;

(E) gear members rotatably mounted on each said spindles in meshing relationship with the gear members in each said row so that rotation of one said gear member effects rotation of all said gear members in each said row, said gear members being vertically mounted on said spindles between said horizontally mounted swivel wheels and said frame so that said swivel wheels of each said spindle bear on the gear members of each said spindle so as to rotate whenever said gear members are caused to rotate, said swivel wheels being disposed to rotate in a common direction upon rotation of said gear members;
(F) means for effecting rotation of said gear members;
(G) means for rotating said connecting means so as to position the wheels of each said row.

4. Transfer apparatus for supporting and conveying sheets in alternate directions, comprising:
(A) a supporting frame;
(B) a plurality of vertical spindles rotatably mounted on said frame extending upwardly therefrom and arranged in parallel transverse rows;
(C) yoke members connected to each said spindles and means so as to effect rotation of said spindles upon rotation of said yoke members;
(D) link members linking each said yoke member of each row so that rotation of one spindle effects rotation of all spindles in each said rows;
(E) a plurality of swivel wheels, one each horizontally mounted to the top of each said spindles and said swivel wheels in each said rows being disposed to rotate in parallel vertical planes;
(F) gear members rotatably mounted on each said spindles in meshing relationship with the gear members of the adjacent spindles of each row so that rotation of one said gear member effects rotation of all said gear members in said row, said gear members being positioned on said spindles between said vertically mounted swivel wheels and said frame so that said swivel wheels of each said spindles bear on the gear members so as to rotate in a common direction whenever said gear members are caused to rotate;
(G) means for effecting rotation of said gear members;
(H) means for controlling the position of said link members so as to position the wheels of each said row.

5. Transfer apparatus for supporting and conveying sheets in alternate directions, comprising:
(A) a supporting frame;
(B) a plurality of vertical spindles rotatably mounted on said frame extending upwardly therefrom and arranged in parallel transverse rows;
(C) yoke means attached to each said spindles so as to effect rotation of said spindles upon rotation of said yoke means;
(D) link members linking said yoke members of each row so that rotation of one spindle effects rotation of all spindles in each said rows;
(E) a plurality of swivel wheels, one each horizontally mounted to the top end of said spindles and said swivel wheels in each said rows being disposed to rotate in parallel vertical planes;
(F) gear members vertically mounted on each said spindles in meshing relationship with the gear members of the adjacent spindles of each row so that rotation of one said gear member effects rotation of all said gear members in said row, said gear members being positioned on said spindles between said vertically mounted swivel wheels and said frame so that said swivel wheels on each said spindles bear on the gear members so as to rotate in a common direction whenever said gear members are caused to rotate;
(G) driving means comprising a vertical shaft having a gear member at the top end thereof in meshing relationship with one of said gear members of each said rows, clutch means disposed to connect one of two drive means to said vertically extending shaft and a lever pivotally connected to both said clutch means and said link members so as to effect clutch engagement with one said driving means when said swivel wheels are rotated to one direction and effect clutch engagement with said second driving means when said swivel wheels are rotated to a second direction.

6. A transfer apparatus for transferring sheets from a primary conveyor composed of a multiplicity of conveyor units to a secondary conveyor, comprising:
(A) a plurality of vertically mounted swivel wheels arranged in first and second rows,
(1) said first rows being positioned transversely to said primary conveyor between conveyor units of said primary conveyor and each row of said swivel wheels being disposed to swivel to a first and second direction,
(a) said first direction being substantially parallel to said primary conveyor so as to convey sheets along said primary conveyor,
(b) said second direction being lateral to said said primary conveyor so as to convey sheets laterally from said primary conveyor,
(2) said second rows being positioned transversely to said secondary conveyor between said secondary conveyor and said primary conveyor adjacent to said first rows so as to receive sheets conveyed laterally from said primary conveyor by said first rows and each row of said second rows of said wheels being disposed to swivel to a first and second direction,
(a) said first direction being lateral to said secondary conveyor and being in substantial alignment with said second direction of said first rows so as to receive sheets conveyed laterally from said primary conveyor by said first rows,
(b) said second direction being substantially parallel to said secondary conveyor so as to convey sheets onto said secondary conveyor;
(B) means for effecting rotation of said swivel wheels so as to convey sheets along said primary and secondary conveyors; and
(C) means for swiveling said rows of swivel wheels from and to their first and second directions.

7. A transfer apparatus according to claim 6, in which the secondary conveyor extends laterally from the primary conveyor at an angle of about 90° and the direction of the second direction of the first rows of swivel wheels and the first direction of the second rows of swivel wheels forms an angle of approximately 45° from the direction of travel of the primary conveyor.

8. A transfer conveyor according to claim 7, in which means are provided to cause said first rows of swivel wheels to rotate at approximately the speed of the primary conveyor when in their first direction and at an accelerated speed when in their second direction and said second rows to rotate at said accelerated speed when in their first direction and at the speed of the secondary conveyor when in their second direction.

9. A transfer conveyor according to claim 7, in which means are provided to cause the first rows of swivel wheels to rotate at a speed approximately equivalent to that of the primary conveyor when in their first direction and at a speed approximately equivalent to the speed of the primary conveyor multipled by the square root of 2 when in their second direction, and said second rows of swivel wheels to rotate at approximately the speed of the first rows in their second direction when said second rows are in their first direction and at the speed of the secondary conveyor when in their second direction.

10. A transfer apparatus according to claim 6, in which the direction of the second direction of said first rows of swivel wheels and the first direction of said second rows of swivel wheels is an intermediary angle between the direction of the primary conveyor and the direction of the secondary conveyor.

11. A transfer conveyor according to claim 10, in which means are provided to cause the first rows of swivel wheels to rotate at approximately the speed of the primary conveyor when in their first direction and at an accelerated speed when in their second direction, and said second rows to rotate at approximately the speed of the first rows in their second direction when the second rows are in their first direction and at the speed of the secondary conveyor when said second rows are in their second direction.

12. A transfer conveyor according to claim 11, in which control means are provided for transferring to the secondary conveyor sheets preselected for said transfer on said primary conveyor, comprising:
 (A) sensing means for detecting the presence of said preselected sheets and determining:
  (1) when each said sheet has passed entirely onto rows of said first rows of swivel wheels,
  (2) when the leading edge of said sheet has been conveyed beyond specific rows of said first rows of swivel wheels,
  (3) when the trailing edge of each said sheet has been conveyed beyond specific rows of said first rows of swivel wheels,
  (4) when said sheet has been conveyed onto said second rows and is indexed with said secondary conveyor, and
  (5) when the trailing edge of said sheet has passed over the last row of said swivel wheels onto said secondary conveyor;
 (B) control means responsive to said respective sensing means for:
  (1) causing said first rows of swivel wheels contacting said sheet to swivel from their first direction to their second direction when said sheet has passed entirely onto said first rows,
  (2) causing each specific row of said first rows of swivel wheels to swivel from their first direction to their second direction when the leading edge of said sheet has been conveyed beyond the preceding row of said specific first rows of swivel wheels,
  (3) causing each specific row of said first row of swivel wheels to swivel from their second direction to their first direction when the trailing edge of said sheet has been conveyed beyond said specific rows of said first rows of swivel wheels,
  (4) causing said second rows of swivel wheels to swivel to their second direction whenever said sheets has been conveyed onto said second rows and is indexed with said secondary conveyor, and causing said first rows of swivel wheels which are swiveled to their second direction to return to their first direction, and
  (5) causing said second rows of swivel wheels to swivel to their first direction when said sheet has passed entirely onto said secondary conveyor and the trailing edge has passed off of the last row of said second rows.

13. A transfer conveyor according to claim 6, in which control means are provided for transferring to the secondary conveyor sheets preselected for said transfer on said primary conveyor, comprising:
 (A) sensing means for detecting the presence of said preselected sheets and determining:
  (1) when each said sheet has passed entirely onto rows of said first rows of swivel wheels,
  (2) when the leading edge of said sheet has been conveyed beyond specific rows of said first rows of swivel wheels,
  (3) when the trailing edge of each said sheet has been conveyed beyond specific rows of said first rows of swivel wheels,
  (4) when said sheet has been conveyed onto said second rows and is indexed with said secondary conveyor, and
  (5) when the trailing edge of said sheet has passed over the last row of said swivel wheels onto said secondary conveyor;
 (B) control means responsive to said respective sensing means for:
  (1) causing said first rows of swivel wheels contacting said sheet to swivel from their first direction to their second direction when said sheet has passed entirely onto said rows,
  (2) causing each specific row of said first rows of swivel wheels to swivel from their first direction to their second direction when the leading edge of said sheet has been conveyed beyond the preceding row of said specific first rows of swivel wheels,
  (3) causing each specific row of said first rows of swivel wheels to swivel from their second direction to their first direction when the trailing edge of said sheet has been conveyed beyond said specfic rows of said first rows of swivel wheels,
  (4) causing said second rows of swivel wheels to swivel to their second direction whenever said sheet has been conveyed onto said second rows and is indexed with said secondary conveyor, and causing said first rows of swivel wheels which are swiveled to their second direction to return to their first direction, and
  (5) causing said second rows of swivel wheels to swivel to their first direction when said sheet has passed entirely onto said secondary conveyor and the trailing edge has passed off of the last row of said second rows.

14. A distribution conveyor for distributing sheets, comprising:
 (A) a primary conveyor comprising a plurality of in line conveyor units disposed to convey sheets in a predetermined linear direction;
 (B) a plurality of secondary conveyors extending laterally from said primary conveyor and disposed to convey sheets away from said primary conveyor;
 (C) transfer apparatus disposed to transfer sheets from said primary line to said secondary lines, said transfer apparatus comprising:
  (1) a plurality of first swivel wheels arranged in rows transversely between units of said primary conveyor adjacent each said laterally extending secondary conveyor,
  (2) a plurality of second swivel wheels arranged in rows transversely to each said secondary conveyor and positioned between said first conveyor adjacent each said first rows of swivel wheels,
   (a) each said first rows of swivel wheels being disposed to swivel and rotate in a first direction substantially parallel to the direction of said primary conveyor and a second direction at an angle bisecting the angle between the direction of the primary conveyor and the direction of the adjacent secondary conveyor,
   (b) said second rows of swivel wheels being disposed to swivel and rotate in a first direction substantially parallel to the second direction of said first rows of swivel wheels so as to receive sheets therefrom and a second direction which is substantially parallel to the conveyor direction of the adjacent secondary conveyor;
 (D) means for effecting a rotation of said swivel wheels so as to convey sheets along said primary and secondary conveyors;

(E) means for causing said rows of swivel wheels to swivel to their first and second directions.

15. A distribution conveyor according to claim 14, in which means are provided to rotate said first rows of swivel wheels at approximately the speed of the primary conveyor when they are in their first direction and at a greater speed when they are in their second direction, and further to rotate said second rows of swivel wheels at said greater speed when they are in their first direction and a second speed that is approximately equivalent to the speed of said secondary conveyor when they are in their second direction.

16. A distribution conveyor according to claim 14, in which the secondary conveyor extends laterally from the primary conveyor at an angle of about 90° and the direction of the second direction of the first rows of swivel wheels and the first direction of said second row of swivel wheels forms an angle of approximately 45° from the direction of the primary conveyor.

17. A distribution conveyor according to claim 16, in which means are provided to rotate said first rows of swivel wheels at the speed of the primary conveyor when they are in their first direction and at a speed of approximately the speed of the primary conveyor multiplied by the square root of 2 when in their second direction, and to rotate said second rows of swivel wheels at said greater speed when they are in their first direction and at the speed of the secondary conveyor when they are in their second direction.

References Cited by the Examiner
UNITED STATES PATENTS 2,136,267 11/38 Taylor _______________ 198—38
3,100,039 8/63 Oderman _____________ 198—33

SAMUEL F. COLEMAN, *Primary Examiner.*
EDWARD A. SROKA, *Examiner.*